(12) United States Patent
Khatwa et al.

(10) Patent No.: US 9,092,976 B2
(45) Date of Patent: Jul. 28, 2015

(54) SYSTEMS AND METHODS FOR PROVIDING RUNWAY-ENTRY AWARENESS AND ALERTING

(75) Inventors: Ratan Khatwa, Sammamish, WA (US); Chris Hamblin, League City, TX (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 282 days.

(21) Appl. No.: 13/616,782

(22) Filed: Sep. 14, 2012

(65) Prior Publication Data
US 2014/0077975 A1    Mar. 20, 2014

(51) Int. Cl.
*G01C 21/00* (2006.01)
*G08G 5/00* (2006.01)
*B64F 1/20* (2006.01)
(Continued)

(52) U.S. Cl.
CPC .............. *G08G 5/0065* (2013.01); *G08G 5/025* (2013.01); *G08G 5/065* (2013.01); *G05D 1/0653* (2013.01); *G08G 5/0021* (2013.01)

(58) Field of Classification Search
CPC ... G08G 5/0065; G08G 5/025; G08G 5/0013; G08G 5/0021; G08G 5/065; G08G 5/0082; G08G 5/0086; G01C 5/005; G01C 23/005; G01C 5/06; G05D 1/0653; G05D 1/0083; G01S 13/882; G01S 19/15; G01S 2013/916
USPC ......... 340/945, 952, 963, 961, 967, 970, 500, 340/948, 972, 979, 959, 969, 947, 965, 340/951; 701/3, 4, 7, 9, 13, 15, 120, 16, 701/301, 11; 244/111, 183, 75.1, 76 R; 303/126
See application file for complete search history.

(56) References Cited

U.S. PATENT DOCUMENTS 7,342,514 B1    3/2008  Bailey et al.
7,551,990 B2 *  6/2009  Khatwa ............................ 701/9
(Continued)

FOREIGN PATENT DOCUMENTS

EP   2148260 A1   1/2010
EP   2327962 A2   6/2011
EP   2355071 A1   8/2011

OTHER PUBLICATIONS

Chase et al.; Mitigating Runway Incursions: A Safety Benefits Assessment of Airport Surface Moving Map Displays; United States Department of Transportation Volpe National Transportation Systems Center, Cambridge MA, Presented at the 2010 International Conference on Human-Computer Interaction in Aeronautics (HCI-Aero) Nov. 3-5, 2010, Cape Canaveral, FL.
(Continued)

*Primary Examiner* — Mirza Alam
(74) *Attorney, Agent, or Firm* — Ingrassia Fisher & Lorenz, P.C.

(57) ABSTRACT

Systems and methods for providing runway entry awareness and alerting. An exemplary system includes a processing device that determines pilot intent based on one of a manual runway selection, automatic runway selection, aircraft information received from one or more sensors or received clearance information; receives at least one of aircraft position or motion information; determines if a no access condition exists based on the received information, the stored airport information and the determined pilot intent; and generates at least one of a hold-short gate still image or animation, if the no access condition exists.

15 Claims, 4 Drawing Sheets

(51) Int. Cl.
 *G08G 5/02* (2006.01)
 *G08G 5/06* (2006.01)
 *G05D 1/06* (2006.01)

(56) References Cited

U.S. PATENT DOCUMENTS

| | | | |
|---|---|---|---|
| 7,818,100 B2* | 10/2010 | Goodman et al. | 701/16 |
| 8,193,948 B1* | 6/2012 | Shapiro et al. | 340/965 |
| 2003/0107499 A1* | 6/2003 | Lepere et al. | 340/945 |
| 2005/0006524 A1* | 1/2005 | Villaume et al. | 244/111 |
| 2007/0078591 A1* | 4/2007 | Meunier et al. | 701/120 |
| 2007/0241936 A1 | 10/2007 | Arthur et al. | |
| 2008/0249675 A1* | 10/2008 | Goodman et al. | 701/16 |
| 2009/0115637 A1* | 5/2009 | Naimer et al. | 340/979 |
| 2010/0070115 A1 | 3/2010 | Villaume | |
| 2010/0125403 A1 | 5/2010 | Clark et al. | |

OTHER PUBLICATIONS

Hersman; News & Events—NTSB—National Transportation Safety Board, http://www.ntsb.gov/news/speeches/hersman/daph091201.html; Deborah A.P. Hersman, Chairman, National Transportation Safety Board, To the FAA International Runway Safety Summit, Washington, DC., Dec. 1, 2009.

Yeh et al.; Surface moving map industry survey; Federal Nation Administration; DOT-VNTSC-FAA-09-15, Presented at the 2010 International Conference on Human-Computer Interaction in Aeronautics (HCI-Aero), Nov. 3-5, 2010, Cape Canaveral FL. [http://www.ntsb.gov/news/speeches/hersman/daph091201.html].

EP Search Report for Application No. EP 13183373.3 dated May 16, 2014.

EP Examination Report for Application No. EP 13183373.3 dated Jun. 12, 2014.

* cited by examiner

SYSTEMS AND METHODS FOR PROVIDING RUNWAY-ENTRY AWARENESS AND ALERTING

BACKGROUND OF THE INVENTION

Runway incursions continue to threaten aviation safety during ground operations. A runway incursion is any unauthorized intrusion onto a runway, regardless of whether or not an aircraft presents a potential conflict. Airport signs and taxiway markings are designed to provide pilots with awareness to prevent such events from occurring; however, human errors due to poor visibility, fatigue, lack of position awareness, misunderstood air traffic control (ATC) clearances, or inadvertent flight-deck distractions still occur. In some cases this has led to inappropriate runway entry by the aircraft. Honeywell® has attempted to augment the pilots' positional awareness at the airport by developing airport moving maps (AMM) that provides both two- and three-dimensional views of the airport environment, commonly known as 2D AMM and 3D AMM.

Hold-position markings painted on airport surfaces indicate locations where an airplane is required to stop. Hold-position markings are used in three instances: 1) taxiways, 2) runways, and 3) runway approach areas. When used on taxiways, the markings identify the location for an airplane to stop if it does not have clearance to proceed onto a runway, at a controlled airport, or does not have adequate separation from traffic, at an uncontrolled airport. Hold lines may also be used on the taxiway to control traffic through taxiway intersections and instrument-landing system/microwave-landing system (ILS/MLS) critical areas. On runways, the markings are used for land and hold-short operations (LAHSO). Hold-position markings are also used at airports where the taxiway is located in the approach or departure area of a runway.

The virtual airport environments depicted in 2D AMM and 3D AMM affords the opportunity to augment the pilots' positional awareness by providing additional information and cues that do not exist in the real world. The virtual hold gate is one such example. The virtual hold gate replicates the hold lines seen on the airport runway or taxiway surface (see FIG. 1) in the 3D AMM environment. In the existing design, depiction of the virtual hold gate is rotated 90 degrees to the plane of the airport surface, in order to appear as a barrier blocking the path of the airplane. Activation of the existing animation is determined by the aircraft's proximity to the associated hold-short line and the aircraft's heading, relative to the location of the associated hold-short line. The virtual hold gate fades in as the aircraft approaches the hold-short line. The virtual hold gate fades out as the aircraft slows down to zero ground speed, prior to crossing the hold-short line.

SUMMARY OF THE INVENTION

The present invention provides improved awareness regarding aircraft access to runways or taxiways. An exemplary system located on an aircraft includes a memory device that stores airport information (i.e., runway and taxiway information), a processing device, and an output device. The processing device determines pilot intent based on one of a manual runway selection, automatic runway selection, aircraft information received from one or more sensors or received clearance information; receives at least one of aircraft position or motion information; determines if a no access condition exists based on the received information, the stored airport information and the determined pilot intent; and generates at least one of a hold-short gate still image or animation, if the no access condition exists. An output device outputs the generated at least one of a hold-short gate still image or animation.

BRIEF DESCRIPTION OF THE DRAWINGS

Preferred and alternative embodiments of the present invention are described in detail below with reference to the following drawings.

DETAILED DESCRIPTION OF THE INVENTION

Figure 2:
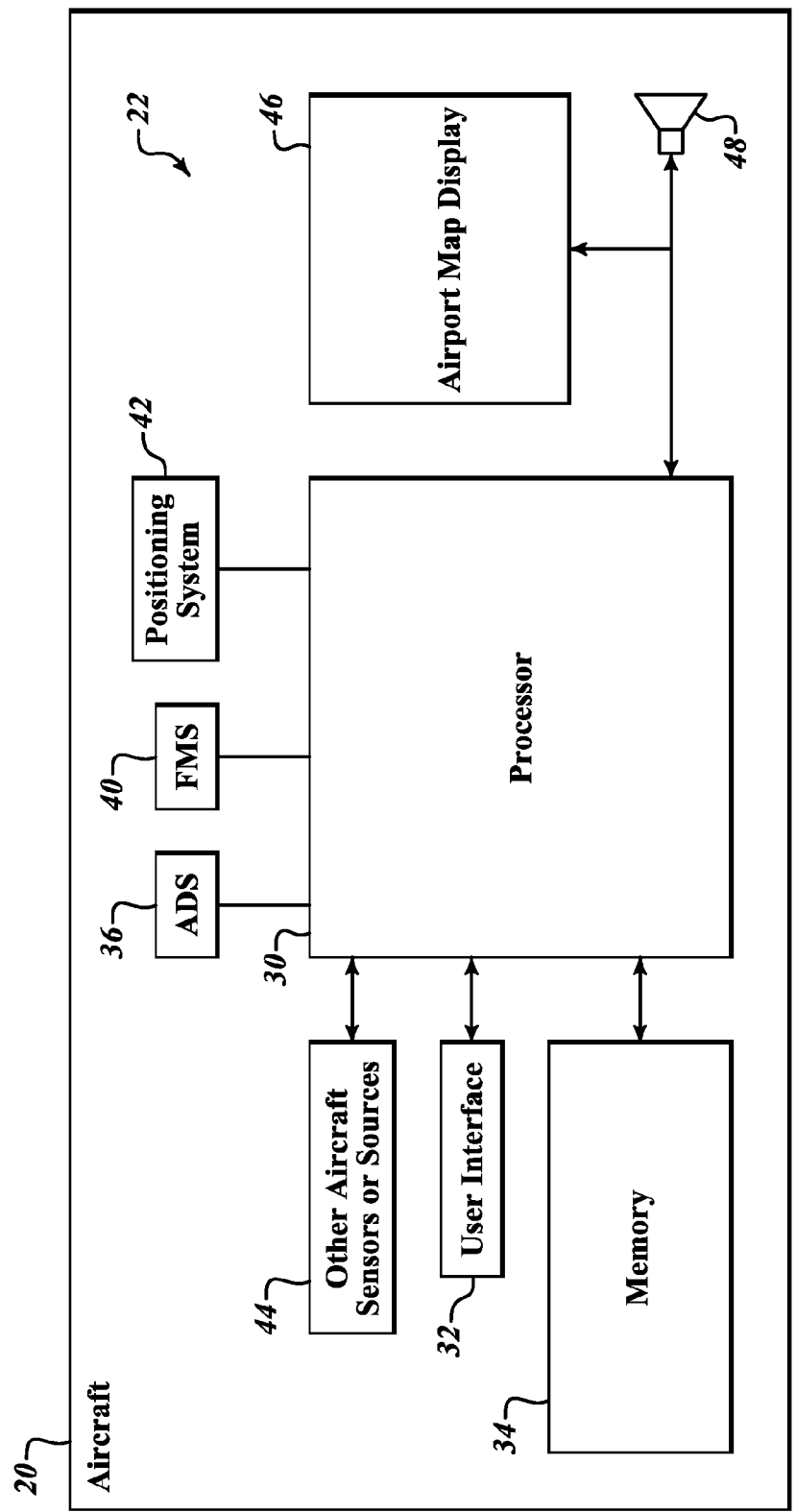
FIG. 2 is a block diagram of an exemplary system formed in accordance with an embodiment of the present invention.

In one embodiment, as shown in FIG. 2, an aircraft 20 includes a system 22 for providing improved hold-short information for runways/taxiways. The system 22 includes a processor 30, a user interface (UI) device 32, memory 34 (airport database), an air data system (ADS) 36, a flight management system (FMS) 40, a positioning system (e.g., GPS, INS) 42, other aircraft sensors or sources (e.g., weight-on-wheels (WOW) switch or a remote source accessed via a communication device) 44, and output devices (e.g., a display device 46, a speaker(s) 48, a haptic device). The processor 30 receives data from various sources (the UI device 32, memory 34, the ADS 36, the FMS 40 (takeoff and landing (TOLD) data), the positioning system 42, and/or the other sensors or sources 44), then determines whether it is safe for the aircraft to proceed for taxiing or taking off or landing on a selected runway. If the processor 30 determines that it is not safe to proceed, an alert is outputted to the flight crew via the output device(s). A state of a hold gate presented in a two- or three-dimensional (2D or 3D) airport moving map (AMM) on the display 46 is based on air traffic control (ATC) clearance data and data from other aircraft systems (e.g., 36, 40, 42) to enhance the pilots' awareness with respect to runway entry status and to increase the safety of ground operations.

Figure 1:
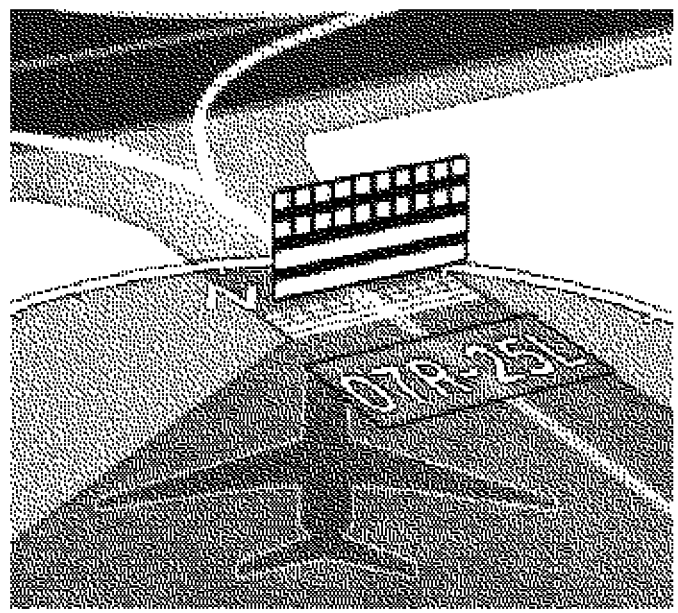
FIG. 1 is an screen shot of a virtual hold-short gate formed in accordance with an embodiment of the present invention.
Figure 3:
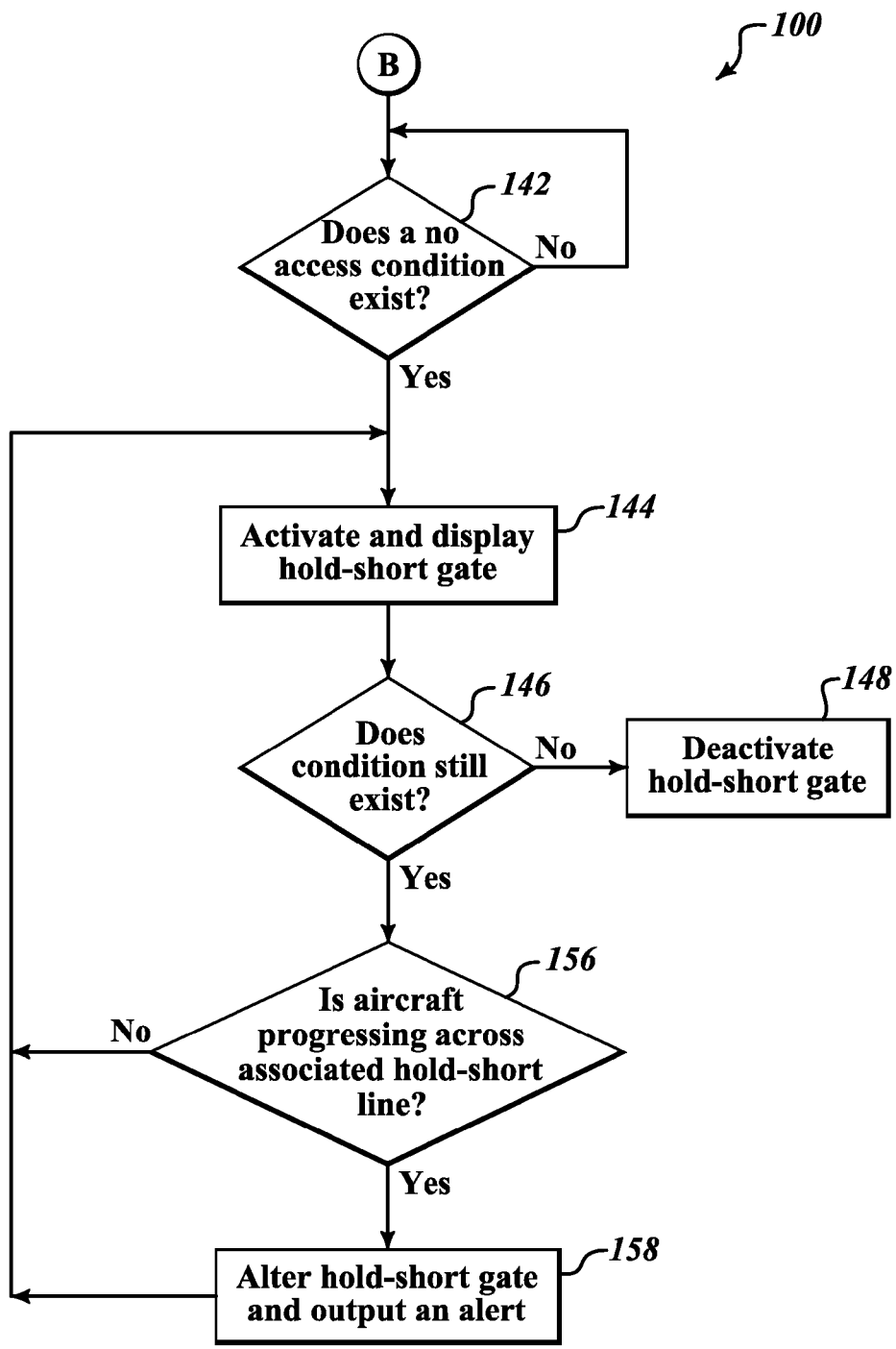
FIG. 3 show a flow diagram of an exemplary process performed by the system shown in FIG. 2.

FIG. 3 illustrates an exemplary process 100 performed by the system 22 shown in FIG. 1. First, at a decision block 142, the processor 30 determines if a condition exists for alerting the flight crew to not access a runway. If, the processor 30 determines that the condition exists, then, at a block 144, the system 22 activates (displays) a hold-short gate in the AMM. Next, at a decision block 146, the processor 30 determines if the condition still exists. If the condition does not still exist, then, at a block 148, the hold-short gate is deactivated (e.g., dropped, lowered, faded-out). If the condition does still exist, then, at a decision block 156, the processor 30 determines if the aircraft is progressing across the hold-short line. If the aircraft is not progressing across the hold-short line, the process 100 returns to decision block 142. If the aircraft is progressing across the hold-short line, then at a block 158, the processor 30 alters the hold-short gate, and outputs a corresponding alert and the process 100 returns to decision block 142.

Aural alerts may be provided instead of or in conjunction with the visual alerts. For example, an advisory alert might be "Approaching Three-Four-Right 3000 feet available" and a caution alert might be "Caution Short Runway", "Go-Around Short Runway", or "Caution No Clearance to Land".

In one embodiment, the no access condition occurs when a short-runway determination has been made. The following are examples of some of the data that the processor 30 (e.g., FMS) receives and uses for making the short-runway determination: TOLD data, (takeoff/landing distance required (T/LDR)), or raw data, such as groundspeed, barometric pressure, ambient pressure, aircraft position, aircraft on ground, aircraft state (e.g., takeoff state, landing state, cruise state), thrust selection (FLEX or full takeoff thrust), aircraft track, outside air temperature (OAT), inertial reference unit (IRU) acceleration, heading, turn rate, altitude, runway distance, runway conditions (e.g., moisture, snow, ice), aircraft weight and balance, aircraft trim and flap positions, or friction level ($M_e$) (pilot entered). Runway condition (e.g., wet, dry, snow, etc.) is either by pilot entry or datalinked. Each of these runway conditions is associated with rolling and braking friction coefficient data, typically as a function of groundspeed.

The TOLD data include or use data manually entered by the flight crew and/or received from sensors, such as gross takeoff weight (GTOW), flap setting, and thrust setting. The FMS 40 receives air temperature from the ADS 36 and knows the runway because it was entered as part of the flight plan or the processor 30 received the runway from another system (e.g., a runway-picker process performed by a runway awareness and alerting system (RAAS) or datalink clearance). The FMS 40 computes such requirements as: airspeeds important or useful to the operation of the aircraft (V speeds), runway length requirements (i.e., TOLD data), obstacle clearance and engine-aircraft limits. If the performance calculations performed by the FMS (using TOLD) were to determine that a runway was not long enough, the processor 30 generates and outputs virtual hold-gate barriers and/or alerts to prevent inappropriate runway entry.

Figure 4:
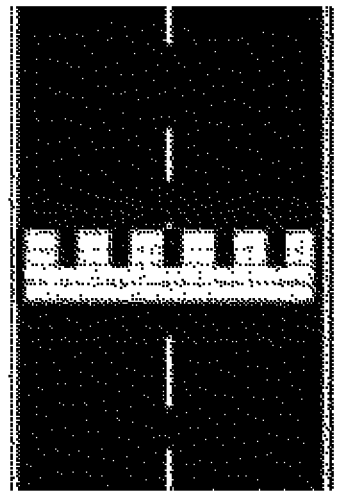
FIG. 4 is a screen shot of an exemplary hold-short gate for a runway crossing situation.
Figure 4:
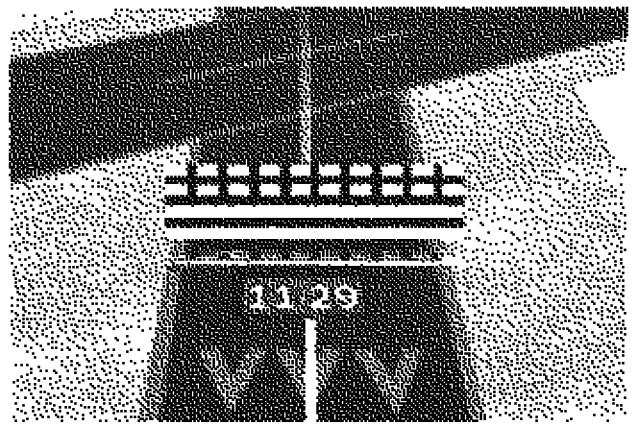

In one embodiment, the processor 30 presents on the display 46 an indication of when the aircraft 20 has been assigned and accepted a land and hold-short (LAHSO) clearance. For example, a 3D hold gate appears in front of the intersecting runway as shown in FIG. 4 thus providing an additional visual cue or virtual barrier to help reduce the likelihood of a runway incursion. Similarly, the 3D hold gate would "open" (fade out) only once the aircraft is cleared to cross it, otherwise visual and aural alerting described above is provided.

In one embodiment, the processor 30 receives a pilot selection of desired runway made during flight planning, in order to check if a takeoff location meets takeoff requirements. This selection is made based on an action (e.g., point and click using a cursor control device) performed by a user operating the UI device 32 to select a point on a runway presented on the display 46 (an airport moving map (AMM)).

In one embodiment, the state of the hold gate can be integrated with controller/pilot datalink communications (CP-DLC), received from a remote source via the communication device. For example, takeoff and taxiway clearances are datalinked to the aircraft 20. As long as the aircraft 20 is not cleared to cross a hold line, the 3D AMM presents a 3D virtual hold gate in a vertical position at the associated hold-short line in the AMM, as shown as in FIG. 1. If the aircraft continues to cross the 3D virtual hold-short gate while the gate is deployed, an aural, visual and/or tactile alert is provided (i.e., change in color of the hold-short gate, flashing of hold-short gate, aural annunciation "CAUTION, unauthorized runway entry", etc.). When an ATC clearance to cross the associated hold line (i.e., authorized runway entry) has been received, the 3D hold-short gate moves to an all-clear position (i.e., the gate disappears, fades out, folds down, etc.).

In one embodiment, the processor 30 visually alters a centerline of the taxiway(s) (e.g., animated green lights on the taxiway line used at some airports) according to clearance information entered by a pilot (via the user interface 32) or received at the processor 30 from a remote entity (e.g., ATC) via the communication device.

In one embodiment, the hold-short gate is animated when the processor 30 receives temporary or permanent runway closures. For example a notice to airmen (NOTAM) and/or automated terminal information service (ATIS) may include runway closure information. In some cases, only partial runway closures may be in effect (e.g., first one thousand feet of a runway closed for maintenance operations). In a partial runway closure situation, the processor 30 keeps only the hold-short gates that lead to the closed runway section, thus providing an indication that runway entry is prohibited. The runway closure data can be transmitted via a datalink to the aircraft 20 (e.g., digital NOTAM or ATIS) or is manually entered by the pilot via the UI 32. Data referring to closed runways and taxiways would be used by the processor 30 to update the depiction of the airport environment with virtual barriers that could help prevent aircraft from taxiing into closed areas. Similar alerting to that described above would be provided if the aircraft attempted to cross the hold-short line.

In one embodiment, presentation of the hold-short gate is tied to navigation and performance data stored in the FMS 40. If the system 22 determines that the aircraft 20 was being maneuvered for entry onto a runway other than the FMS-selected departure runway, the hold-short gate(s) (virtual barriers) and associated alerts could be generated to prevent the pilots from taking off from the incorrect runway.

In one embodiment, presentation of the hold-short gate is linked to alerts and annunciations within Honeywell's SmartRunway®/SmartLanding® system. For example, the SmartRunway® system provides an advisory message, when approaching a runway edge, but does not ensure aircraft will or can be stopped before a hold-short line. Presenting the hold-short gate provides additional visual cues, thus creating a multisensory advisory to prevent inappropriate runway entry. The hold-short gate remains "closed" until the aircraft is cleared to enter the runway. In one embodiment, the hold-short gate is tailored to fade in, based on timing of the SmartRunway's® "Approaching Runway" advisory alert (function of groundspeed and heading and so, for higher groundspeeds, the gate would fade in earlier to provide more timely awareness).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention, in which an exclusive property or privilege is claimed, are defined as follows:

1. A method performed on an aircraft, the method comprising:
    at a memory device,
        storing airport information;
    at a processing device,
        determining pilot intent based on one of a manual runway selection, automatic runway selection, aircraft information
        received from one or more sensors or received clearance information;

receiving at least one of aircraft position or motion information;

determining a no access condition exists based on the received information, the stored airport information and the determined pilot intent;

generating at least one of a hold-short gate still image or a hold-short gate animation, based on the determination of the no access condition;

determining if the aircraft is at least one of proceeding towards a hold-short line, associated with the hold-short gate still image or hold-short gate animation, faster than a predefined threshold speed or is within a threshold distance from the hold-short line associated with the hold-short gate still image or hold-short gate animation; and at an output device, outputting the generated at least one of a hold-short gate still image or a hold-short gate animation.

2. The method of claim 1, wherein the clearance information comprises an identification of a runway associated with the determined pilot intent.

3. The method of claim 2, wherein the no access condition comprises closure information for an intended runway, no clearance information for the intended runway or a short runway condition.

4. The method of claim 3, wherein the clearance information comprises at least one of takeoff clearance, taxi clearance or land and hold short clearance.

5. The method of claim 3, wherein the closure information comprises data received via a data link with a system remote from the aircraft.

6. The method of claim 1, wherein the output device is a display device, wherein the at least one of a hold-short gate still image or hold-short gate animation is presented in a perspective view on an airport moving map image.

7. The method of claim 6, wherein the perspective view is associated with the aircraft's position relative to the airport associated with the airport moving map image.

8. The method of claim 1, further comprising:

at the processing device, altering the hold-short gate still image or hold-short gate animation presented on the output device, if the aircraft is determined to be proceeding toward the hold-short line faster than the predefined threshold speed or is within the threshold distance and the no access condition still exists.

9. A system located on an aircraft, the system comprising:
a memory device configured to store airport information;
a processing device in signal communication with the memory device, the processing device configured to, determine pilot intent based on one of a manual runway selection, automatic runway selection, aircraft information received from one or more sensors or received clearance information;

receive at least one of aircraft position or motion information;

determine if a no access condition exists based on the received information, the stored airport information and the determined pilot intent;

generate at least one of a hold-short gate still image or animation, if the no access condition exists;

determine if the aircraft is at least one of proceeding toward a hold-short line, associated with the hold-short gate still image or animation, faster than a predefined threshold speed or is within a threshold distance from the hold-short line associated with the hold-short gate still image or animation; and alter the hold-short gate still image or animation presented on an output device, if the aircraft is determined to be proceeding toward the hold-short line faster than the predefined threshold speed or is within the threshold distance and the no access condition still exists; and the output device configured to output the generated at least one hold-short gate still image or animation.

10. The system of claim 9, wherein the clearance information comprises an identification of a runway associated with the determined pilot intent.

11. The system of claim 10, wherein the no access condition comprises closure information for an intended runway, no clearance information for the intended runway or a short runway condition.

12. The system of claim 11, wherein the clearance information comprises at least one of takeoff clearance, taxi clearance or land and hold short clearance.

13. The system of claim 11, wherein the closure information comprises data received via a data link with a system remote from the aircraft.

14. The system of claim 9, wherein the output device comprises a display device, wherein the at least one of a hold-short gate still image or animation is presented in a perspective view on an airport moving map image.

15. The system of claim 14, wherein the perspective view is associated with the aircraft's position relative to the airport associated with the airport moving map image.

* * * * *